Sept. 14, 1943.　　　J. Y. BLAZEK ET AL　　　2,329,382
CRANKSHAFT LOCATOR
Filed Jan. 15, 1941

INVENTORS.
John Y. Blazek, Gilbert E. Sears and Vernon R. Roy.
BY
Bay Macklin, Grohick and Williams
ATTORNEYS.

Patented Sept. 14, 1943

2,329,382

UNITED STATES PATENT OFFICE 2,329,382

CRANKSHAFT LOCATOR

John Y. Blazek, Bedford, and Gilbert E. Sears and Vernon R. Roy, Cleveland, Ohio, assignors to Lempco Products, Inc., Bedford, Ohio, a corporation of Ohio Application January 15, 1941, Serial No. 374,507

3 Claims. (Cl. 51—165)

This invention has general reference to an instrument for locating an article relatively to another article. To be more specific, such instrument is particularly adapted for locating the axis of a pin of a crankshaft relatively to the axis of rotation of a spindle of a crankshaft grinder.

Such grinders, as is well known to those skilled in the art, conventionally comprise a pair of self-centering chucks, one for the head stock and one for the tail stock, the chucks being slidable along parallel rectilinear slideways which are rotatable along a common axis. Since the throw of a crankshaft is a known quantity, it will be obvious that if the chucks are slid along their respective slideways until the distance between the axis of rotation of such slideways and the center of the chucks is equal to such quantity, then the throw or eccentricity of a particular pin will be completely compensated for if the axis of such a pin coincides with the axis of rotation of the slideways. When this equality and coincidence occurs, the chucks are locked to the slideways and the ends of the crankshaft are gripped by the chucks. Grinding of such pin may then be accomplished, because the crankshaft rotates about the axis of such pin.

Means for causing such coincidence has heretofore been provided in the form of an inverted Y, the stem of which intersects and is slidable perpendicularly to the axis of rotation of the slideways and the diverging arms of which are adapted for engaging the periphery of the pin which it is desired to grind. However, such means have not been found to be accurate to a satisfactory degree and a pronounced want has been felt for more accurate means. One of the primary objects of this invention has been to provide such more accurate crankshaft locating means.

Further objects of this invention have been to provide locating means, as above set forth, which present but one crankshaft engaging surface and which is accurate.

To the accomplishment of the foregoing and related ends, said invention, then, consists of the means hereinafter fully described and particularly pointed out in the claims; the annexed drawing and the following description setting forth in detail certain structure embodying the invention, such disclosed structure constituting, however, but one of various forms in which the principle of the invention may be used.

In said annexed drawing—

Figure 1:
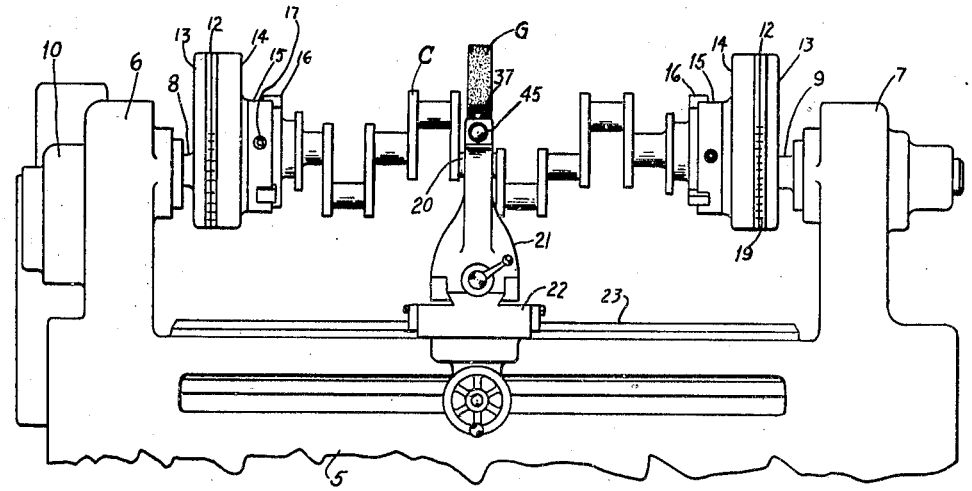
Fig. 1 is a fragmentary side elevation of a crankshaft grinder provided with a crankshaft locator having incorporated therein the principal features of this invention, the crankshaft locator being seen in front elevation.

For purposes of illustration we will describe our crankshaft locator in conjunction with the crankshaft grinder, but it will be understood that the same is equally adapted for use in conjunction with devices other than grinders, such as lathes or the like. It will be further understood that the term "crankshaft" is intended to cover any and all articles provided with an eccentric portion.

The crankshaft grinder which we have illustrated comprises a base 5 provided with a head stock 6 and a tail stock 7 provided with spindles 8 and 9 respectively, the spindle 8 of the head stock being driven by suitable means 10. The above described slideways, indicated by the reference character 12, are provided on blocks 13 which are carried by the spindles. These slideways are engaged by slideways of blocks 14 which in turn carry the above described chucks 15 provided with jaws 16 which are actuated by suitable control elements 17. Means may be provided for drivingly interconnecting the spindles so that they rotate in unison with the slideways similarly disposed, or the spindle 9 may be freely rotatable and means comprising a plunger and plunger receiving recess may be provided in the head and tail stock and the spindle so that when the plunger occupies the plunger receiving recesses, then the spindles are locked against rotation and the slideways 12 are similarly disposed. Suitable indicia 19 may be provided on adjacent surfaces of the blocks so that the center or axis of the chucks may be offset or spaced from the axis of the spindles an amount equal to the throw or eccentricity of any pin such as the pin 20 of the crankshaft C. Suitable steady rest means for the crankshaft is carried by an upwardly extending block 21 which is preferably stationarily mounted on a carriage 22 which in turn is slidable along the crankshaft on longitudinally extending slideways 23 of the base.

Our locator per se will now be described and, in general, comprises an arm 30, a surface 31 of which is adapted for engaging the pin 20, the arm being movable transversely on the base, and there being accurately adjustable micrometer means 32 interposed between the block and the arm for spacing the surface 31 from the axis of the spindles.

More particularly, the arm 30 and the upper portion of the block 21 are provided with transversely extending horizontally disposed mating slideways 34. For locking the arm to the block there is extending upwardly from the latter and projecting through a slot 35 of the former, a threaded stud 36 which carries a thumb nut 37. The bottom face of the arm, it will be noted, is provided with a socket or recess defined by the slideways 34. Supported by the arm as by projecting through the outer wall 40 of this recess, which wall may or may not be integral with the arm, is a nut 41 of the above-described micrometer means, the end 42 of the screw of which projects into the recess and engages a wear-receiving button 43 which is supported by the block 21. The other end 45 of this screw is provided with graduations 46 which may be of the type conventionally found on micrometer screws. The outwardly projecting portion of the nut 41 is provided with graduations 48, preferably provided with a zero point 49 with graduations on either side thereof. The graduations 46 and 48 are such that when they are at the zero position, the surface 31 will lie on the axis of the spindle. These graduations preferably directly indicate the diameter rather than the radius of the pin 20, it being noted that the portion 31 will then be spaced from the axis of the spindle a distance equal to the radius of the pin.

The surface 31 preferably is not unitary nor integral with the arm 30 but is removable and is maintained by means of a bolt 52 which engages a suitable nut 53 provided with wear-resisting material 54 which presents such surface. This surface is preferably plane and parallel to the axis of the spindles and is vertically disposed. Thus this surface tangentially engages the pin 20.

We do not wish to be restricted to the particular form of micrometer means which we have described, the same being solely for purposes of illustration and not for purposes of limitation. For instance, the micrometer screw, instead of being threaded to the arm 30 and abutting the block 21, could be threaded to the latter and abut the former. It will also be understood that the arm, although shown as movable horizontally, will function equally well if movable other than horizontally.

When it is desired to grind a particular pin, such as the pin 20 of the crankshaft C, the eccentricity (throw) of the axis of such pin with respect to the main axis of the crankshaft is determined and the diameter of such pin is also determined. The eccentricity can be determined from the crankshaft manufacturer's specification and the diameter can be determined by direct measurement. Let us assume the eccentricity to be 3 inches and the diameter to be 1½ inches.

Figure 2:
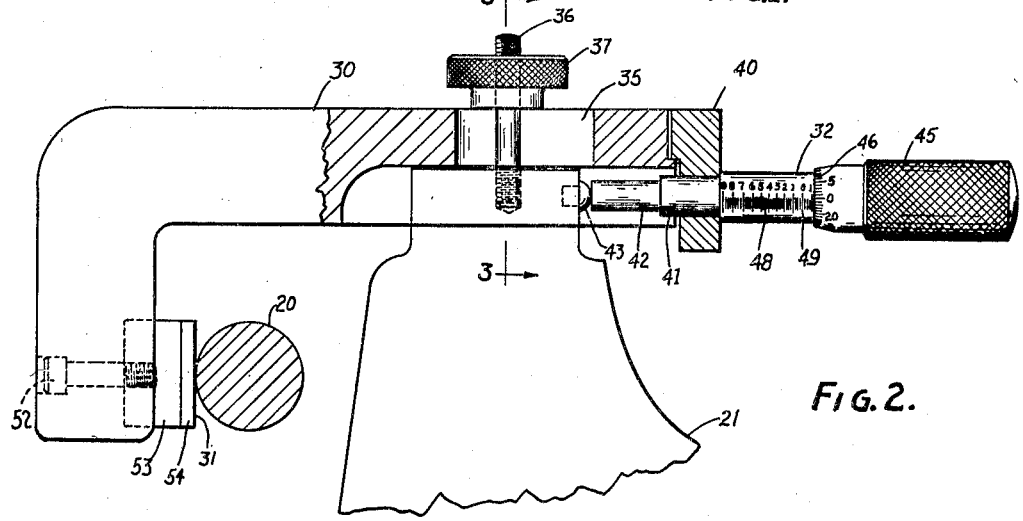
Fig. 2 is a partially fragmentary and partially sectional side elevation of the crankshaft locator seen in Fig. 1.
Figure 3:
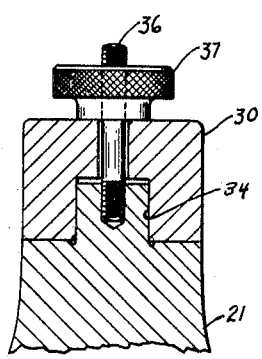
Fig. 3 is a section taken on the line 3—3 of Fig. 2.

The spindles are locked against rotation with the blocks 13 similarly disposed. The blocks 13 and 14 will be adjusted until the indicia 19 reads 3 at which time the center of the chucks 15 will be 3 inches from the axis of the spindles 8 and 9. Our locator is then mounted on the block 21, as in Fig. 2, and the graduations 46 and 48 are set at 1.500 at which time the surface 31 will be spaced .750 from the axis of the spindles. The pin 20 and the surface 31 are brought into contact, as in Fig. 2, and the chucks tightened whereupon the spindles may be unlocked. Our locator is removed by manipulation of the thumb nut 37 and the tool or grind wheel G brought into grinding position with the pin while the crankshaft rotates about the axes of the spindles and of the pin 20, such axes being coincident.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. A machine for performing work on a pin of a crankshaft, comprising spindle means for rotating said crankshaft with the main axis of the crankshaft spaced from the axis of said spindle means a distance equal to the throw of said pin, a supporting post carried by the machine and provided with a relatively fixed abutment, an arm slidable on said post and having depending portions at opposite ends thereof, an adjustable abutment carried by one of the depending portions for engagement with said fixed abutment, the other of said depending portions of said arm carrying a pin contacting gauge movable along a line intersecting the axis of said spindle means for positioning said pin concentrically with respect to the axis of said spindle means, said arm being arranged to position the gauge against the pin with said pin lying between the gauge and post.

2. A machine for performing work on a pin of a crankshaft, comprising spindle means for rotating said crankshaft with the main axis of the crankshaft spaced from the axis of said spindle means a distance equal to the throw of said pin, a supporting post carried by the machine and provided with a relatively fixed abutment, a slotted arm slidable on said post and having depending portions at opposite ends thereof, an adjustable abutment carried by one of the depending portions for engagement with said fixed abutment, the other of said depending portions of said arm carrying a pin contacting gauge movable along a line intersecting the axis of said spindle means for positioning said pin concentrically with respect to the axis of said spindle means, said arm being arranged to position the gauge against the pin with said pin lying between the gauge and post, a bolt extending from the end of the post and passing through the slot in said arm and means carried by the bolt for locking the arm in place.

3. A machine for performing work on a pin of a crankshaft, comprising a spindle means for rotating said crankshaft with the main axis of said crankshaft spaced from the axis of said spindle means a distance equal to the throw of said pin, a supporting post having a slideway at its upper end carried by the machine and provided with a relatively fixed abutment, an arm slidable across the top of said post and having a recess therein receiving the slideway of the post, said arm having depending portions at opposite ends thereof, an adjustable abutment carried by one of the depending portions for engagement with said fixed abutment, the other of said depending portions of said arm carrying a pin contacting gauge movable along a line intersecting the axis of said spindle means for positioning said pin concentrically with respect to the axis of said spindle means, said arm being arranged to position the gauge against the pin with said pin lying between the gauge and post.

JOHN Y. BLAZEK.
GILBERT E. SEARS.
VERNON R. ROY.